(12) United States Patent
Lin et al.

(10) Patent No.: US 6,507,742 B1
(45) Date of Patent: Jan. 14, 2003

(54) AUTOMATIC COLOR CODE (SAT) ASSIGNMENT METHOD USED IN FREQUENCY PLANNING FOR WIRELESS NETWORKS

(75) Inventors: Zongde Lin, Frisco, TX (US); Jianxu James Shi, Dallas, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/438,748

(22) Filed: Nov. 11, 1999

(51) Int. Cl.[7] .................................................. H04Q 7/22
(52) U.S. Cl. ........................ 455/446; 455/422; 455/447; 455/464
(58) Field of Search ................................. 455/446, 447, 455/422, 456, 450, 423, 54.1, 503, 67.6

(56) References Cited

U.S. PATENT DOCUMENTS

| | | | |
|---|---|---|---|
| 5,293,645 A | * 3/1994 | Sood | 455/54.1 |
| 5,561,839 A | * 10/1996 | Osterberg et al. | 455/33.1 |
| 5,732,353 A | * 3/1998 | Haartsen | 455/450 |
| 5,926,762 A | * 7/1999 | Apree et al. | 455/447 |
| 5,974,324 A | * 10/1999 | Henson | 455/447 |
| 6,021,316 A | * 2/2000 | Heiska et al. | 455/67.6 |
| 6,023,625 A | * 2/2000 | Myers, Jr. | 455/503 |
| 6,144,851 A | * 11/2000 | Quershi | 455/422 |
| 6,148,211 A | * 11/2000 | Reed et al. | 455/456 |
| 6,154,654 A | * 11/2000 | Mao | 455/446 |
| 6,212,386 B1 | * 4/2001 | Briere et al. | 455/447 |
| 6,253,086 B1 | * 6/2001 | Parantainen et al. | 455/446 |
| 6,330,439 B1 | * 12/2001 | Shin et al. | 455/423 |

* cited by examiner

Primary Examiner—Edward F. Urban
Assistant Examiner—Henry M. Quach

(57) ABSTRACT

A method of automatically adaptively assigning color codes to radio channels in the wireless network. The method comprises the steps of assigning an initial color code to a channel using a propagation prediction technique and automatically optimizing the initial color code assignment of the channel using radio disturbance measurement data when an alternate color code with the least amount of disturbance is identified.

20 Claims, 4 Drawing Sheets

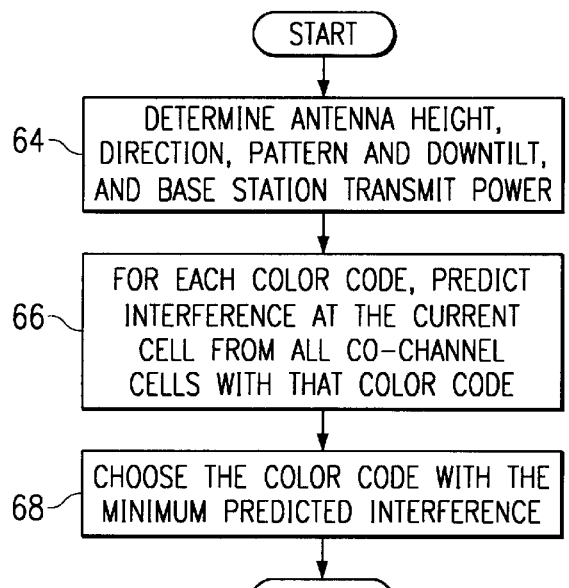
FIG. 6
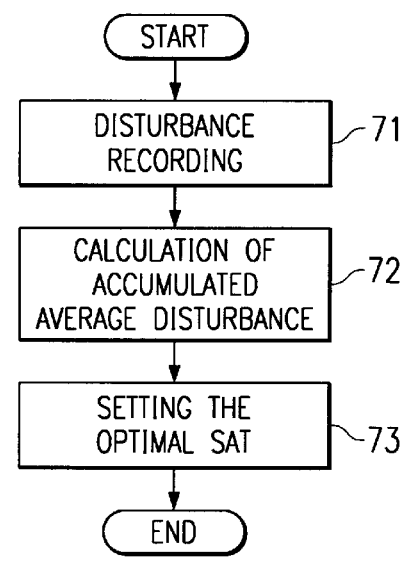
FIG. 7
| INDEX OF DISTURBANCE | AVERAGE DISTURBANCE (AXE UNIT) | DISTURBANCE DURATION (SECOND) | SAT VALUE |
|---|---|---|---|
| 1 | $D_1^0$ | $t$ | 0 |
| 2 | $D_2^1$ | $t^1$ | 1 |
| 3 | $D_3^1$ | $t^2$ | 1 |
| 4 | $D_4^2$ | $t^3$ | 2 |
| 5 | $D_5^0$ | $t^4$ | 0 |
| 6 | $D_6^0$ | $t^5$ | 0 |
| ... | ... | ... | ... |
| n | $D_n^1$ | $t$ | 1 |
FIG. 8

AUTOMATIC COLOR CODE (SAT) ASSIGNMENT METHOD USED IN FREQUENCY PLANNING FOR WIRELESS NETWORKS

TECHNICAL FIELD

This invention relates generally to wireless communication systems, and more particularly to a method and system for automatic color code assignment to radio channels in a wireless telecommunications network. More specifically, the present invention relates to the optimization of color code assignments to differentiate carrier signals from co-channel interference in the network coverage area.

BACKGROUND OF THE INVENTION

Wireless communication technology has experienced unprecedented growth, fueled by advances in radio frequency, satellite, and microelectronic technologies and the convenience of access to telephony and portable wireless devices. Several technologies have emerged for providing wireless communications, including analog systems such as Advanced Mobile Phone System (AMPS), and digital systems such as Time Division Multiple Access (TMDA, previously called D-AMPS) and Global System for Mobile Communications (GSM). Such systems typically rely on frequency reuse plans to maximize network capacity and operate in interference-limited radio environments.

Because radio spectrum allocated to a wireless network is a limited resource (both in physical and regulatory sense), schemes to reuse the available radio resources among as many subscribers as possible are often employed. Such schemes seek to maximize spectrum allocation efficiency at a specific Quality of Service (QoS). For example, radio spectrum can be divided into many carrier frequencies spaced apart, with a certain number of carrier frequencies assigned to each base station subsystem (BSS) for serving subscribers entering its coverage area. The frequency allocation to cells in the network usually follows a pre-determined frequency reuse pattern such as 7/21, 4/12, or 3/9, etc. The multiple use of the same frequencies or channels in cells with geographical separation ensures radio spectrum efficiency, but introduces undesirable co-channel interference within wireless networks.

One of co-channel interference impacts on wireless communications is to disable the Mobile Station's (MS) or Base Station Subsystem's (BSS) ability to recognize the desirable carrier signal from its co-channel disturbances. This impact directly results in degradation of network service quality, especially during radio network access, call setup, and hand-off, etc. If color codes or Supervisory Audio Tones (SAT) are not properly assigned to radio channels, it may be difficult to distinguish a carrier signal from its co-channel interferences, which can result in calls being dropped, hand-off failure, or cross-talk if an MS/BSS picks up a co-channel and co-SAT signal, during a call access or hand-off.

To overcome this problem, color code assignment methodologies are used in wireless communication networks for assisting an MS or BSS to distinguish a carrier signal from its co-channel interferences. A color code set consists of different integral numbers with each assigned to one of several co-channel cells (or frequencies) that are located geographically closest to each other. Based upon the color code value decoded from all received radio signals, an MS/BSS can uniquely identify the desirable message related to a particular color code assigned to the serving cell or channel.

Currently, color code assignments as practiced in different markets is mostly a manual, individual experience based methodology using cell configuration and frequency assignment as the major information source. However, this current approach is facing an ever-increasing challenge both in efficiency and consistency as advanced frequency planning methods such as Adaptive Channel Allocation (ACA) are deployed to handle network growth. Within the framework of advanced frequency planning, the network is always being tuned to reflect real traffic conditions and, as such, the traditional frequency reuse patterns are no longer fully respected. A color code is required to be assigned to each channel instead of each cell. The automatic assignment of color codes to a radio channel using co-interference prediction and co-channel interference measurements has not, until the present invention, been contemplated.

Thus, a method and system for automatically performing color code assignment based upon measured co-channel interference in the network would provide numerous advantages. The system and method described in the present invention are based on an analog wireless network in which Superiory Audio Tones (SAT) are used as color codes. But the method disclosed in the present invention can be applicable to any wireless network where color codes are assigned to radio channels (or cells) to assist MS/BSS identification of desirable carrier signals.

SUMMARY OF THE INVENTION

The present invention achieves technical advantages by automatically assigning a color code (SAT) to radio channels in a wireless network based on measured indicators of interferences. With the present invention, a color code can be initially assigned and then re-assigned to optimize the initial color code assignment utilizing Radio Disturbance Recordings (RDR) with subsequent calculation of Accumulated Averaged Disturbances (AAD).

Accordingly, disclosed in one embodiment is a method of automatically adaptively assigning color codes to radio channels in a wireless network comprising the step of assigning an initial color code to a radio channel in the network by predicting interference propagation between co-channel cells in the network. The method also includes the step of automatically optimizing the initial color code assignment when an alternate color code is available that would improve the ability to distinguish co-channels in the network. The optimizing step is performed utilizing Radio Disturbance Recordings (RDR) which are used to provide an interference level value and an associated interference duration value for each color code.

Also disclosed is a system for automatic adaptive color coding in a wireless network having a plurality of cell sites. The system comprises a means for assigning an initial color code to a channel in the network by predicting interference propagation between co-channel cells in the network. The system further comprises a means for automatically optimizing the initial color code assignment of the channel when an alternate color code would improve the ability to distinguish co-channels in the network. RDR measurements are used as indications of each channel's interference level value and an associated interference duration value for each color code.

A technical advantage of the method and system of the present invention is the use of current color code assignment schemes in which color codes with the least co-channel interference are assigned to radio channels in the network, thus improving network performance during call setup, hand-off and other network functions.

Another technical advantage is the use of existing RDR data to optimize the initial color code assignment, thus eliminating the need for additional measurements or data collection in the network.

Another technical advantage is the use of automation in color code assignment, thus eliminating extensive labor and time involved in manually assigning color codes for the network.

BRIEF DESCRIPTION OF THE DRAWINGS

The above features and advantages of the present invention will be more clearly understood from consideration of the following descriptions in connection with accompanying drawings in which:

FIG. 6 is a flowchart of the interference propagation prediction technique used in the automatic adaptive coding method of the present invention;

FIG. 7 is a flowchart of the automatic optimization technique used in the automatic adaptive coding method of the present invention; and FIG. 8 is a table containing RDR data for an analog voice channel during a measurement period.

Corresponding numerals and symbols in the different figures refer to corresponding parts unless otherwise indicated.

DETAILED DESCRIPTION OF THE PREFERRED EMBODIMENT

The following is a description of the method and system of the present invention. The prior art wireless telecommunications network will be discussed first, followed by a description of the preferred embodiments and a discussion of the advantages.

Figure 1:
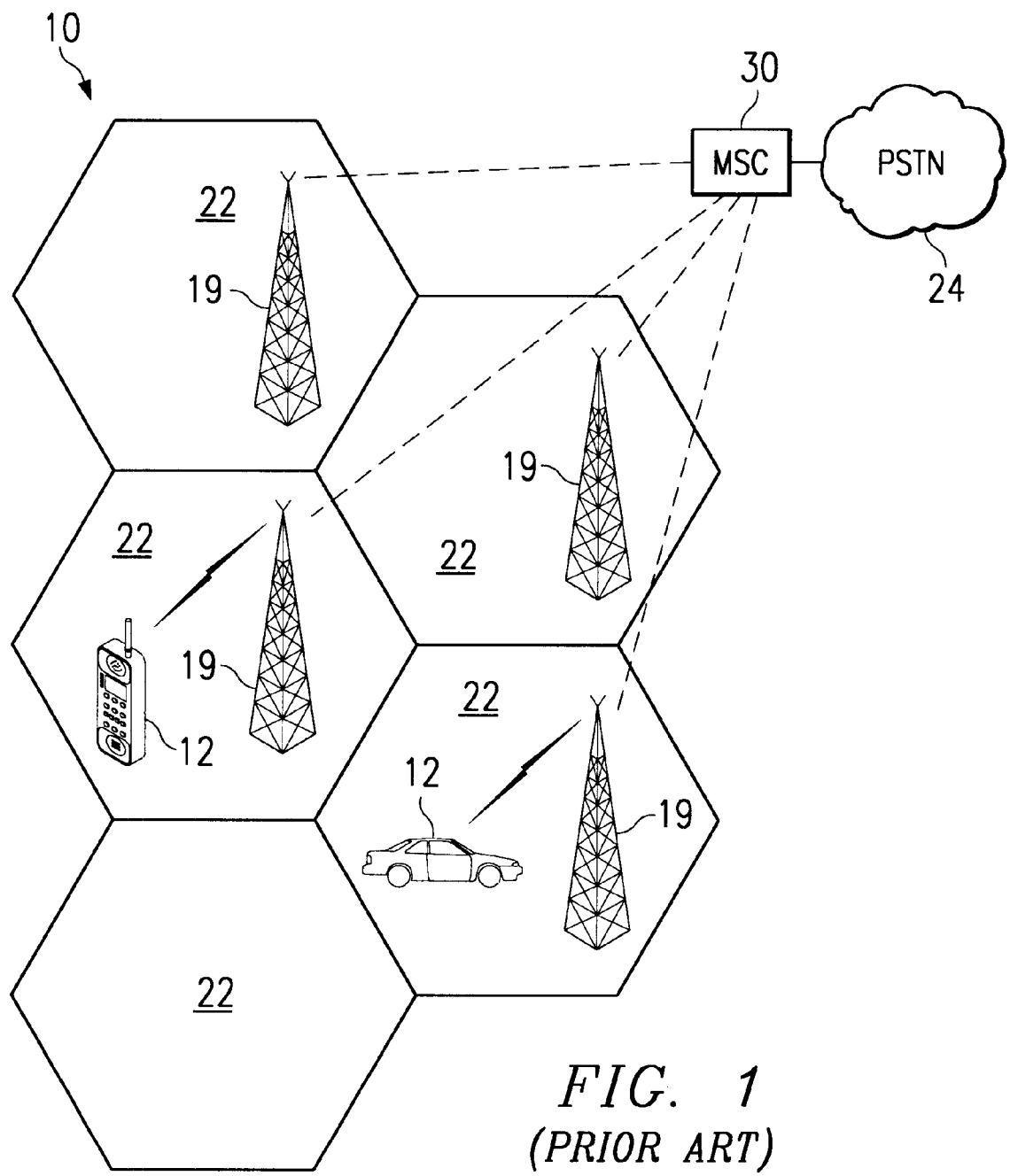
FIG. 1 is a diagram of a wireless communications network in which the invention can be practiced.

With reference to FIG. 1, therein is shown a diagram of a wireless telecommunications network 10. The network 10 is seen to include an originating Mobile Station (MS) 12, which can be a wireless communications device such as a Personal Communications Service (PCS) terminal or cellular phone, but may also include a computer, a Personal Digital Assistant (PDA), or other wireless terminal, for example. A Base Station Subsystem (BSS) 19 provides cellular coverage via a radio frequency (RF) link to the MS 12 and other mobile stations within the cell 22 of network 10.

As shown, the coverage area of the network 10 consists of a plurality of cells 22. In this regard, the terms "cell" or "cells" will be referred to interchangeably throughout. Typically, several BSS 19 are connected to a single Mobile Switching Center (MSC) 30 to provide continuous geographical coverage. The MSC 30 is typically in communication with multiple BSS 19, as well as to fixed networks, such as the Public Switched Telephone Network (PSTN) 24 or an optical network, for example. For illustrative purposes only, the coverage area of a particular cell 22 is shown as hexagonal.

To support communications, the network 10 will assign radio channels for use by the BSS 19 and MS 12. In an analog system, a radio channel consists of a pair of frequencies with specific bandwidth, one for uplink communication, another for downlink communication. Since radio spectrum is a limited resource shared by all network service providers and every provider desires to accommodate as many subscribers as possible, schemes to reuse transmission channels among several BSS 19 are often utilized.

Due to the nature of radio broadcasts, the use of a specified set of frequencies within one area of the network can cause radio disturbance in another area. Color codes or Supervisory Audio Tones (SAT) have been found useful in distinguishing radio channels utilizing the same frequencies.

Figure 2:
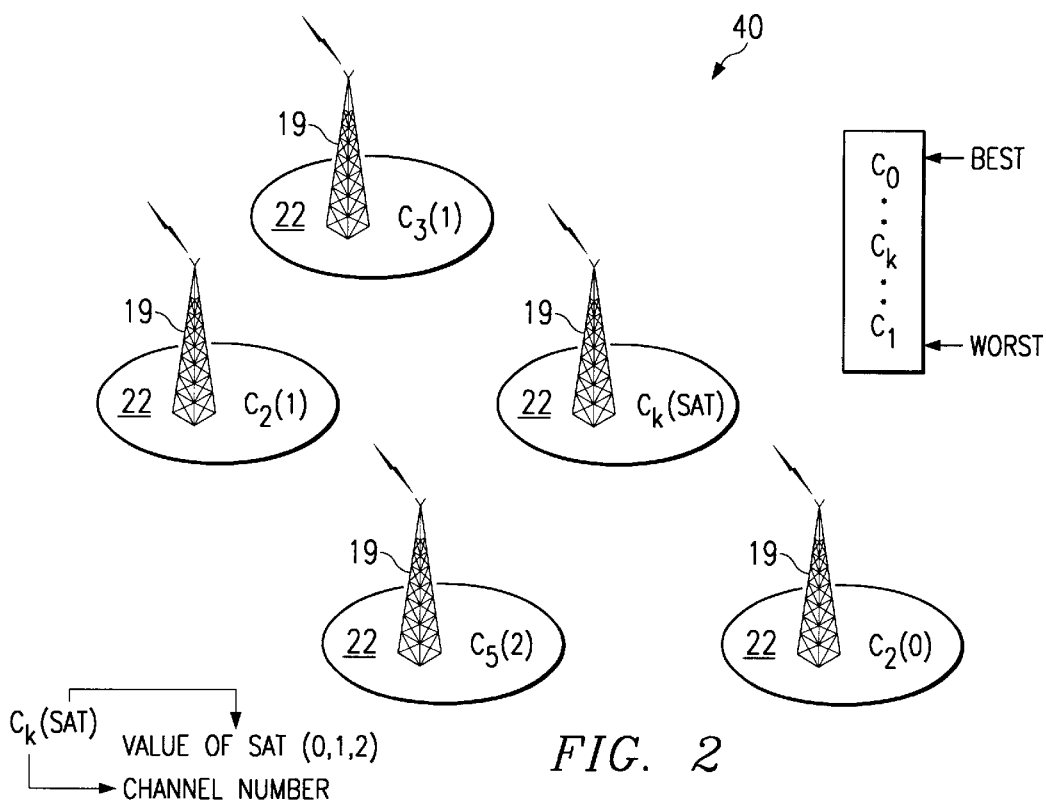
FIG. 2 illustrates the use of color codes in a wireless telecommunications network.

To better understand the use of color codes, reference is made to FIG. 2 which illustrates the use of color codes in a wireless telecommunications network 40 consisting of a plurality of BSS 19. Because radio frequency (RF) spectrum is a limited resource (both in a physical and regulatory sense), schemes to reuse the available network resources among as many subscribers as possible are often employed. For example, a particular RF bandwidth can be divided into many radio channels that are allocated to a network 40. One or more radio channels may be assigned for use by the BSS 19 in the telecommunications network 40, with the same radio channels assigned to the different BSS 19 to increase the capacity of the network 40. Radio channels having the same frequency are generally regarded as co-channels and are distinguished by assigning a color code or SAT to each radio channel. As shown in FIG. 2, the BSS 19 within a cell each have radio channels with assigned color codes consisting of 0, 1, or 2.

To ensure better network service, the most efficient utilization of all radio channels in the network 40 is desired. A method of assigning color codes for radio channels ($C_k$) based on measured levels of interference can be utilized. The BSS 19 within a cell 22 will be assigned particular radio channels ($C_k$) and a color code for each radio channel. The assignment of a color code to each channel provides a means for the MS/BSS combination to distinguish the serving channel from co-channel interferences transmitted other places in the network 40. The present invention provides a way of increasing the effectiveness of color code assignments by considering measured levels of radio disturbance events resulting from interference in the network 40.

In particular, the present invention facilitates automatic color code reassignment utilizing Radio disturbance Recordings (RDR) data. RDR is a feature of wireless telecommunications networks designed to monitor radio disturbances that affect speech quality in a cellular system. Thus, the degree of radio channel interference in the network 40 can be determined from the RDR data. Both interference from co-channel cell sites and external radio interference, which in most cases come from sources outside the cellular system, can be measured.

The use of RDR data is designed to record RF interferences that occur on Mobile Voice Channels (MVC), Mobile Control Channels (MCC), Digital Control Channels (DCCH), and Digital Voice Channels (DVC). A radio interference on any of these channels can be defined as the reception of an RF signal of the same frequency having a signal strength above the level specified by the Signal Strength for Disturbance (SSD) parameter for an idle voice channel. This might be caused by co-channel interference or RF interference from other communication systems operating in the area.

RDR collects data for recording objects (cell sites or voice/control channels) specified in the measuring program associated with the RDR function. Typically, the recording begins and ends at the times specified in a pre-defined time schedule. This time schedule can be used to initiate a specified number of recording periods a day.

Figure 3:
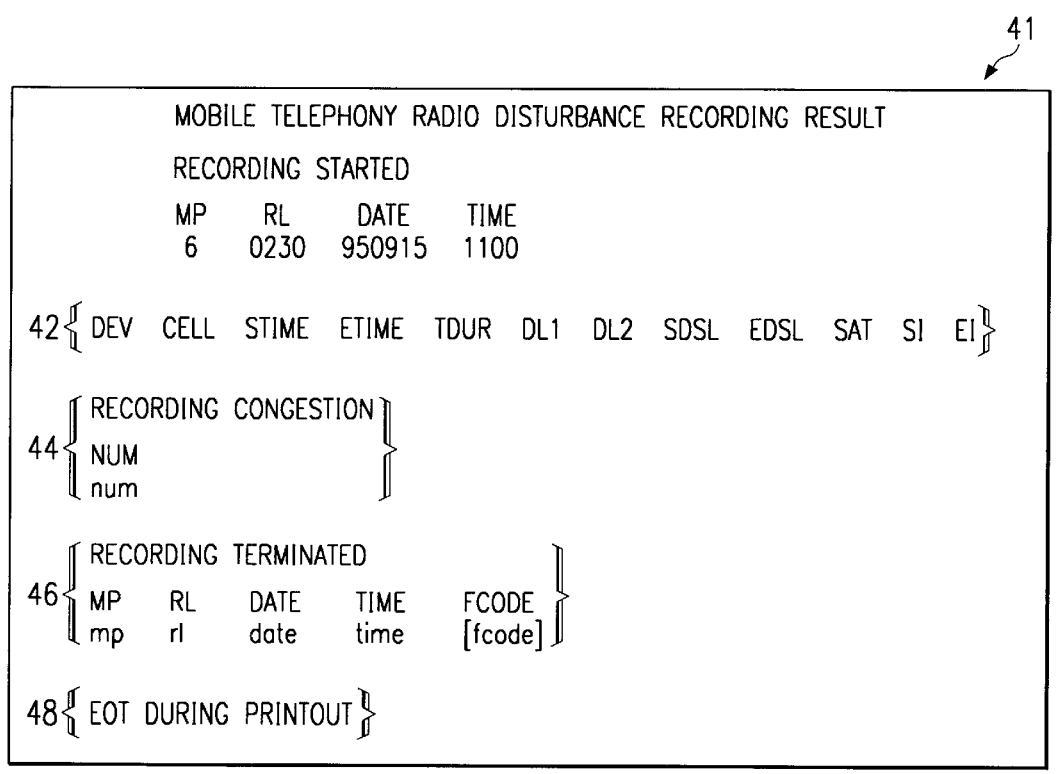
FIG. 3 illustrates a Radio Disturbance Recordings (RDR) record for a wireless telecommunications network.

FIG. 3 illustrates an RDR recording report 41, as an example. Those skilled in the art will appreciate the contexts of RDR recording report 41 and its use, within the context of the present invention, to allow the optimization of initial color code assignments. The RDR recording report 41 contains RF characteristic data which can be used for the purpose of automatically optimizing the channel color code assignment, according to the teachings of the present invention. The values in the measuring data section include:

| | |
|---|---|
| MP | Measuring program number |
| RL | Recording period length |
| DATE | Start or termination date for the recording |
| TIME | Start of termination time for the recording |
| DEV | Voice/control channel designation |
| CELL | Cell Designation |
| STIME | Time when start of the interference was detected |
| ETIME | Time when a stop of the interference was detected |
| TDUR | Time duration of the interference |
| DL1 | Interference level at the start of the interference |
| DL2 | The highest interference level of the interference |
| SDSL | Interference severity at the start of the interference (for control channels) |
| EDSL | Interference severity at the stop of the interference (for control channels) |
| SAT | The color code of the disturbance |

The values in measuring section 42 provide the primary source of RDR data used by the color code optimization method of the present invention. In particular, the voice/control channel designation DEV, the time duration of the interference TDUR, color code of the disturbance SAT, and the interference level, DL1, DL2, SDSL, and EDSL, may be utilized to optimize an initial color code assignment depending on the RDR data for each channel at each cell in the network 40. A DEV is connected to a particular voice channel with a color code to be optimized. This DEV measures all disturbances from inside and outside of the network 40, and is used to decode the color codes (SAT) of disturbances if they are from inside the network. In this regard, the terms "cell" and "BSS" are used interchangeably.

Figure 4:
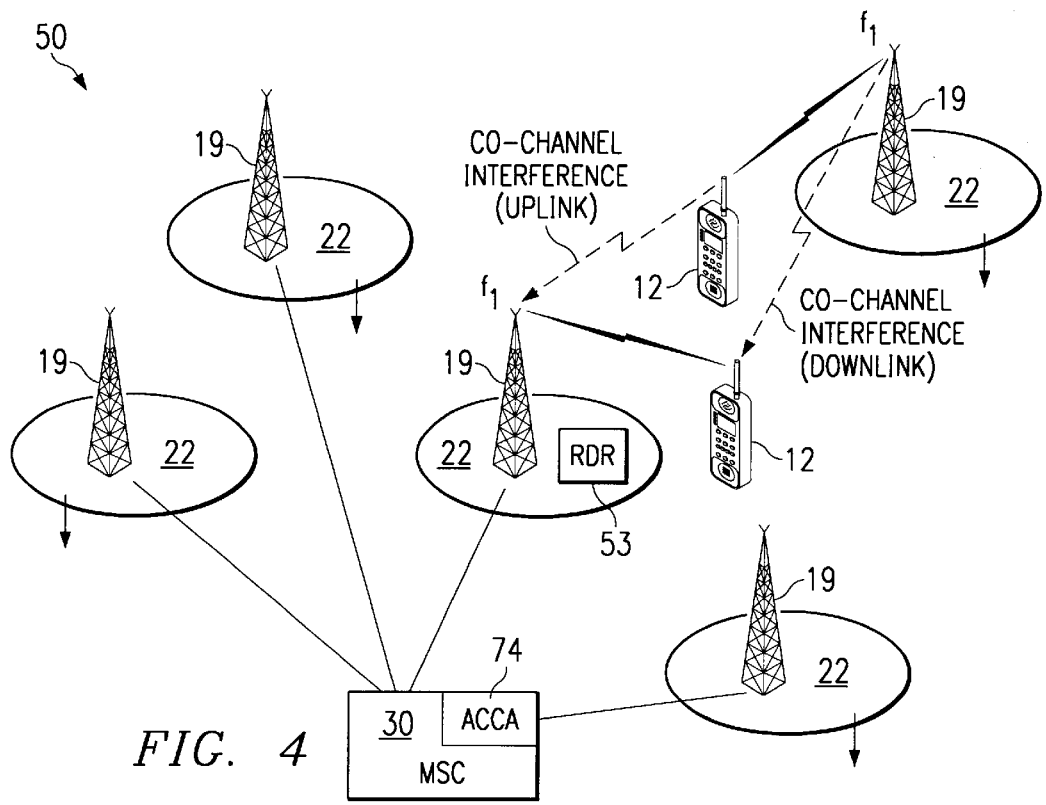
FIG. 4 shows a plurality of cells in a telecommunications network utilizing the automatic adaptive color coding method of the present invention.

As such, the method of optimizing an initial color code assignment by utilizing the RDR data at cells within the wireless network can be utilized and implemented as a new telecommunications network 50 as shown in FIG. 4. The network 50 comprises a plurality of cells 22 at which a plurality of BSS 19 are located. Calls 51 are initiated and carried over radio channels using an air interface between the MS 12 and for BSS 19. Channel assignment to a call, color code assignment to a radio channel and quality monitoring are performed by the network 51 through BSS 19 and MSC 30.

When interference is sufficient to cause a disturbance in the second cell 22, it is recorded by the network 50 in the form of an RDR recording report 41. The RDR reporting mechanism is used to implement the RDR function and store the results as an RDR recording report 41. To differentiate signals from co-channel interference, color codes can be assigned to the same transmission channel of different cells 22 within the coverage area of the network 50. Typically, color codes are utilized within a group of neighboring cells 22 so that, at most, two or three codes (0,1,2) are required. Once assigned, however, the color code is utilized for the entire call session.

The present invention, an automatic adaptive color code assignment method, facilitates the optimization of initial color code assignments based on the physical and technical data about the cell 52 as represented in an RDR recording report 41. The present invention then optimizes the color code assignment utilizing the RDR mechanism 53. As interferences occur during call sessions, disturbances are recorded by the RDR mechanism 53 within the BSS 19, and disturbance data is then forwarded to the MSC 30. Based on RDR measurements, the Automatic Color Code Assignment (ACCA) function 74 in the MSC 30 performs calculation of Accumulated Average Disturbances (AADs) with different color codes for each radio channel. The ACCA function 75 reassigns a color code to each radio channel with an alternate color code that would result in the least amount of co-channel interference.

Figure 5:
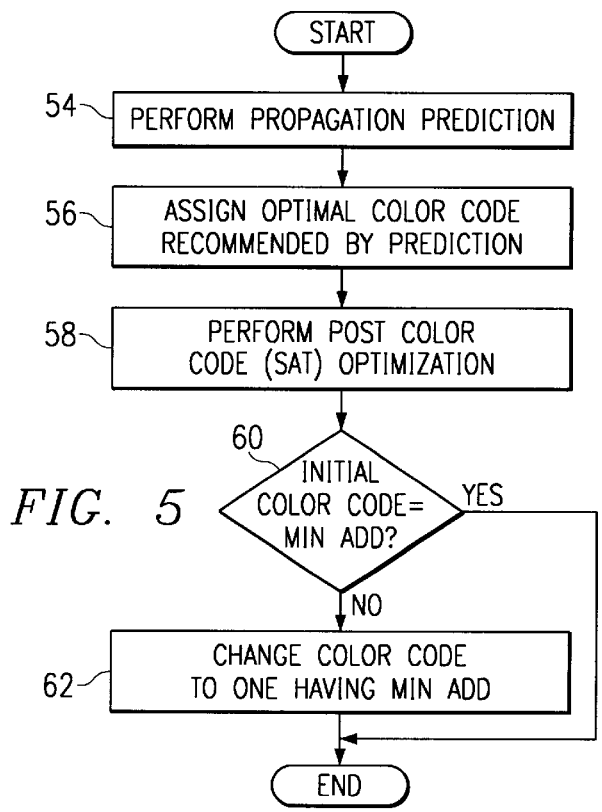
FIG. 5 is a flowchart of the automatic adaptive color coding method of the present invention according to one embodiment.

The automatic adaptive color coding method of the present invention which provides for optimization of color code assignments is shown in more detail in FIG. 5. The initial color code assignment, step 56, is based on propagation prediction, step 54, which calculates the co-channel interference of selected cells 22. Propagation prediction, step 54, utilizes the physical and technical data of the particular cell 22 and terrain to predict a color code having the least amount of interference. The present invention will then assign the predicted color code as the initial color code based upon the propagation prediction step 56. Post color code optimization of the color code, step 58, encompasses utilizing RDR radio frequency characteristic data to derive an optimal color code.

FIG. 6 is a flowchart of the initial color code assignment based on the propagation prediction used in the automatic adaptive coding method of the present invention. Propagation prediction calculates the expected co-channel interference of selected cells 22 given information about the equipment in the cell 22 and the terrain conditions. The assignment method of the invention thus comprises the step of obtaining the cell equipment and terrain data including the antenna height, direction, pattern and downtilt, BSS transmit power, land usage terrain height variation, and distance between co-channel cells, step 64. The propagation characteristics of multiple cells 22 can be predicted at the same time so interference from multiple co-channel cells 22 can be calculated. Using the propagation characteristics obtained, the interference at the current cell 22 as distinguished from all co-channel cells 22 predicted for each of the color codes, 0, 1, and 2, step 66. The color code with the minimum predicted interference is then selected and assigned as the initial color code, step 68. The present invention will then optimize the color code assignment by utilizing an automatic optimization technique.

The automatic optimization technique is shown in the flowchart of FIG. 7. At step 71, a radio interference recording is implemented during measurement period $T_m$. The measurement period $T_m$ is typically designated during busy hours in cells 22 for which the color code needs to be optimized. Basing optimization on measurement data taken during busy hours allows for color code optimization of the channels in instances of high traffic volume which are more likely to result in high levels of interference. Optimizing for instances of high traffic volume will facilitate color code assignment for worse case scenarios. Any co-channel interference to analog voice channels within these cell sites is recorded if the interference value is larger than a threshold interference level SSD.

As shown in FIG. 8, the recorded information includes the average interference level values for each color code. This is accomplished by measuring the interference level for all co-channels in the cell site. These values can be derived from the interference values, DL1, DL2, SDSL, and EDSL, as given in the RDR recording report 41. The associated interference duration values are also utilized by the present invention. The interference duration values can be derived from TDUR of the RDR recording report 41.

Referring back to FIG. 7, the method then comprises step 72 wherein a calculation to determine the Accumulated Average Disturbance (AAD) of each color code is performed. The AAD value for each color code is derived by multiplying each of the average interference level values for a color code by its associated interference duration value and summing the resulting values over all disturbance events. This calculation is represented by the following equation:

$$\text{For } SAT=j, AAD_j = \Sigma D_i / t_i,$$

where i=index of interference, i=1, ... n, j=0, 1, 2

Multiplication of interference level and interference duration is used to define the severity level of each interference. An AAD value for each SAT value is used to define overall severity of co-channel interference level from a particular SAT value.

In step 73 of FIG. 7, the optimal color code is assigned. Given the number of AAD values (three in this embodiment) for each analog channel, the SAT value of the channel can be optimized. If the initial color code (SAT) value of the channel is different from that corresponding to an unique minimum AAD, the assignment is changed to the color code corresponding to the unique minimum AAD. This also holds true if there are two color codes corresponding to the same unique minimum AAD which is different from the initial color code value. Either of the two SAT values corresponding to the same unique minimum AAD can be selected. Finally if all of the AAD values are the same, the initial color code (SAT) value is retained.

While the invention has been described with reference to illustrative embodiments, this description is not intended to be construed in a limiting sense. Various modifications in combinations of the illustrative embodiment, as well as other embodiments of the invention, will be apparent to persons skilled in the art upon reference to the description. For example, the present invention is implemented in an analog network; however, it is contemplated that the present invention may be used with adaptations of digital networks. Also, in the illustrative embodiment, the present invention is implemented in the MSC 52; however, it is contemplated that the present invention might be implemented in other equipment such as the BSS 19. Furthermore, the present invention utilizes data from an RDR report, however it is contemplated that the present invention might be implemented utilizing data from other sources. It is therefore intended that the appended claims encompass any such modifications or embodiments.

What is claimed is:

1. In a telecommunications network having a plurality of cell sites, a method of automatically assigning color codes to channels in the network, comprising the steps of:

assigning an initial color code to a channel by performing a propagation prediction technique wherein said technique includes calculating the expected signal strength of cell sites within the network;

automatically optimizing the initial color code assignment of said channel when an alternate color code with the least amount of disturbance is identified;

utilizing Radio Disturbance Recordings (RDR) having an interference level value and an associated interference duration value;

calculating an accumulated average interference for each color code from the RDR; and selecting an optimal accumulated average interference for each color code by multiplying each said interference level value for the color code by its associated interference duration value and summing each of the resulting values.

2. The method of claim 1 wherein said step of performing a propagation prediction technique further comprises the step of determining the type of cell site equipment and terrain.

3. The method of claim 1 wherein said assigning step further comprises the step of predicting the interference between cell sites having the same color code.

4. The method of claim 1 wherein said assigning step further comprises the step of choosing the color code with the minimum predicted interference.

5. The method of claim 1 wherein said step of automatically optimizing the initial color code assignment comprises utilizing Radio Disturbance Recordings (RDR) to determine channel propagation characteristics.

6. The method of claim 1 wherein said step of automatically optimizing the initial color code assignment further comprises the step of calculating the accumulated average interference for each color code.

7. The method of claim 6 wherein said step of automatically optimizing the initial color code assignment further comprises setting the color code of a cell site to the color code having the optimal accumulated average interference.

8. In a telecommunications network having a plurality of cell sites, a method of automatically assigning color codes to channels in the network, comprising the steps of:

assigning an initial color code to a channel in the network by predicting propagation patterns between neighboring cells in said network;

automatically optimizing the initial color code assignment of said channel when an alternate color code with the least amount of disturbance is identified;

utilizing Radio Disturbance Recordings (RDR) having an interference level value and an associated interference duration value;

calculating an accumulated average interference for each color code from the RDR; and selecting an optimal accumulated average interference for each color code by multiplying each of said interference level value for the color code by its associated interference duration value and summing each of the resulting values.

9. The method of claim 8 wherein said step of performing a propagation prediction technique further comprises the step of determining the type of cell site equipment.

10. The method of claim 8 wherein said step of performing a propagation prediction technique further comprises the step of determining the type of cell site terrain.

11. The method of claim 9 wherein said step of determining the type of cell site equipment further comprises the steps of determining antenna height, direction, pattern and downtilt, and BSS transmit power.

12. The method of claim 10 wherein said step of determining the type of cell site terrain further comprises the steps of determining land usage, terrain height variation, and distance from the cell site.

13. The method of claim 8 wherein said assigning step further comprises the step of predicting the interference between each cell site and all co-channel cells having the same color code.

14. The method of claim 8 wherein said assigning step further comprises the step of choosing the color code with the minimum predicted interference.

15. The method of claim 8 wherein said Radio Disturbance Recordings interference level values are measured during a pre-determined period of time for each cell site.

16. The method of claim 8 wherein said Radio Disturbance Recordings further comprises the step of recording interference level values which are larger than a pre-determined threshold interference level value.

17. The method of claim 8 wherein said step of automatically optimizing the initial color code assignment further comprises the step of setting the color code of a cell site to a post color code having said optimal accumulated average interference if the post color code is different from the initial color code.

18. The method of claim 8 wherein said step of automatically optimizing the initial color code assignment further comprises the step of setting the color code of a cell site to any of two post color codes having the same said optimal accumulated average interference if the post color codes are different from the initial color codes.

19. The method of claim 8 wherein said step of automatically optimizing the initial color code assignment further comprises the step of leaving the assignment of a color code of a cell site at the initial color code if the accumulated average interference is the same for all color codes.

20. A system for automatic color coding in a telecommunications network having cell sites comprising:

a means for assigning an initial color code to a channel in the network by predicting propagation patterns between said cell sites in said network;

a means for automatically optimizing the initial color code assignment of said channel when an alternate color code with the least amount of disturbance is identified, said means utilizing Radio Disturbance Recordings (RDR) having a interference level value and an associated interference duration value;

a means for calculating an accumulated average interference for each color code from the RDR; and a means for selecting an optimal accumulated average interference for each color code by multiplying each of said interference level value for the color code by its associated interference duration value and summing each of the resulting values.

* * * * *